Patented Aug. 7, 1951

2,563,661

UNITED STATES PATENT OFFICE 2,563,661

FABRIC-TREATING COMPOSITION AND METHOD OF PREPARATION

Clifford T. Rood, Racine, Wis., assignor to S. C. Johnson & Son, Inc., Racine, Wis.

No Drawing. Application September 16, 1948, Serial No. 49,664

19 Claims. (Cl. 260—17.4)

This invention relates to a fabric-treating composition and method of preparation. More specifically, it relates to a laundry treating composition adapted for use by the housewife as an ironing aid and in addition imparts a protective, stain-resistant, water-repellent and starchy finish to the fabric.

For many years it has been a common practice among housewives to use laundry starch in either lump or powdered form. The starch ordinarily is prepared by mixing with water and cooking until uniformly dispersed. The cooking time and temperature employed varies with the particular starch used, but is generally from 10 to 30 minutes at a temperature ranging from 55° C. to 100° C. This cooking enables the housewife to more uniformly diffuse the starch particles upon the treated fabric. However, when cooked with water, the starch granules swell and often rupture and upon subsequent ironing, it is found that much of the stiffness-imparting potency of the substance is lost.

By reason of the time required in cooking and also because of the desire to retain the rigidity-imparting properties of the raw or uncooked starch upon subsequent ironing, some housewives either use partially cooked or raw starch in a mixture of cold water. Water-starch mixtures prepared thusly require skill in applying and continuous agitation during employment to avoid settling and packing of the starch. Since neither uncooked or partially cooked starch can be readily and uniformly dispersed in water, the granules have the tendency to aggregate. These aggregations adhere to the fabric and are unevenly distributed thereon and when ironed the finished fabric will bear visible white streaks and starch blotches.

Divers prepared liquid starches are now being marketed which embody a thoroughly cooked starch dispersed in water, e. g., U. S. Patent No. 2,228,784 to Spilka. More recently, a liquid starch has been proposed which contains cooked starch dispersed in an aqueous medium by means of an emulsifying agent. However, these prepared liquid starches have proved unsatisfactory in many instances for upon subsequent ironing it is realized that much of their stiffness imparting properties have been lost in the cooking process.

The use of a fabric-treating composition has been proposed which consists essentially of wax and a polyvalent metal salt dispersed in an aqueous medium for imparting a protective, stain-resistant and water-repellent finish to the fabric. It is necessary to first disperse this composition in water, then the clothes or fabric to be treated are immersed in the solution, wrung and allowed to dry. Because of this time-taking operation, housewives have been reluctant to adopt its use.

Now, in accordance with my invention I have discovered an aqueous fabric-treating composition comprised essentially of wax, water-soluble polyvalent metal salt, protective colloid, cooked starch, raw starch and water, said starches comprising from 50 to 98% of the total solids content of said composition, the raw starch being present in a ratio of at least three parts to each part of cooked starch.

Having indicated in a general way the materials of this invention, the following examples will illustrate the invention. It is to be understood that such examples are presented merely as illustrations of the invention and are not to be construed as limiting the same. In the examples, ingredients are given in parts by weight unless otherwise indicated.

*Example 1*

Nine and two tenths parts of water was heated to a temperature of about 140° F. in a suitable vessel. Three and six-tenths parts of commercial 22% aluminum formate solution, .6 part of polyvinyl alcohol and 5 parts of paraffin having a melting point of 130° F.–132° F. were added to the water in the order named. This mixture was then heated to at least the melting point of the wax employed and thereafter homogenized.

In a second vessel 20 parts of modified waxy maize corn starch was cooked in 370 parts of water for 15 minutes at a temperature of about 190° F. This was then cooled to a temperature of approximately 100° F. The contents of the first vessel were then added to the ingredients in the second while agitation was simultaneously conducted. Eighty parts of raw corn starch was then admixed with the suspension and agitation continued for approximately 5 minutes or until the suspension indicated a "smooth" appearance. An aqueous fabric-treating composition resulted which was further diluted with 5 parts of cold water to each part of composition. Fabrics were immersed therein and upon subsequent ironing the treated fabrics were found to have been rendered a crisp, starchy and strain-resistant, water-repellent finish.

*Example 2*

An aqueous fabric-treating composition was prepared according to Example 1. All ingredients and proportions thereof were identical to those of the first example except that .8 part of aluminum acetate was substituted for the 3.6 parts of aluminum formate solution. Fabrics were immersed in the composition, subsequently ironed and the resulting fabric finish was the same as that obtained in Example 1.

*Example 3*

Example 1 was repeated and portions of the resulting composition were diluted by the addition of various proportions of cold water. These dilutions, varying in concentration per unit volume, bore contrasting results when used to treat fabric in the manner illustrated in the first example. Dilutions were made in the following ratios:

1 part composition to 1 part water
1 part composition to 2 parts water
1 part composition to 5 parts water
1 part composition to 10 parts water
1 part composition to 20 parts water
1 part composition to 30 parts water
1 part composition to 50 parts water The results in the fabric finish were:

1 to 1, 1 to 2—very crisp finish
1 to 5—crisp finish
1 to 10—moderately crisp finish
1 to 20—soft finish
1 to 30—light, soft finish
1 to 50—light, very soft finish A dilution of 1 to 5 is recommended for the treatment of such laundry as shirts, while a 1 to 20 to 1 to 30 ratio is found desirable where table linens, dresses, etc. are to be treated.

A particular feature of the present invention resides in the incorporation of soluble aluminum salts, such as aluminum acetate, aluminum formate, aluminum sulphate, alum and so forth. It is, however, contemplated that the aluminum salt may in part or whole be replaced by other water-soluble polyvalent metal salts such as zinc sulphate, zinc acetate, zinc formate, zirconium oxychloride, zirconium ammonium carbonate and the like. These aluminum salts or other water-soluble polyvalent salts are preferably used in a quantity varying from 5 to 100% of the amount of wax used.

While paraffin is preferred, any suitable wax, such as chlorinated naphthalene, petroleum jelly or petrolatum, beeswax, Japan, spermaceti, oxidized microcrystalline paraffin, montan, candelilla, ozokerite or carnauba wax are operable. While up to 25% by weight of the solids may be wax, it is preferred that from 1 to 15% be used.

Although polyvinyl alcohol has been used as the protective colloid in the examples, other well known colloids such as glue, albumin, gelatine and carbohydrates may be used. The protective colloids may be employed in an amount ranging from .5 to 25% of the solids content of the composition. However, if desired, the protective colloid may be omitted as the cooked starch provides adequate stability.

Whereas the use of raw corn starch and modified waxy maize starch has been illustrated in the examples, it should be understood that both above-ground starches, and below-ground starches may be satisfactorily incorporated, either in combination or alone in this novel composition. The starches, in accordance with this invention, shall constitute from 50 to 98% by weight of the total solids content of the composition. While it is recognized that the cooked starch granules lose much of their stiffness-imparting potency, it has been found that when included in this novel composition with raw starch in a ratio of at least three parts of raw starch to each part of cooked starch, the stiffness-imparting potency of the composition is not materially lessened over a composition incorporating the same quantity of raw starch and no cooked starch. The incorporation of cooked starch with raw starch, in accordance with this invention, renders the resulting composition less viscous, easier to dilute, and materially prolonges the shelf-like of the composition by increasing the stability of the composition.

While it is recommended that at least three parts of raw starch be employed per part of cooked starch, this represents the maximum amount of cooked starch which may be incorporated. The ratio of raw starch may be increased if the stability requirements are less. In commercial practice it is recommended that the ratio of raw starch to cooked starch will be from 3 to 9 parts of raw starch per part of cooked starch.

As shown in Example 3 the composition may be diluted with cold water in various corresponding ratios depending upon the article to be treated, the texture thereof and finish desired. However, it should be realized that whereas a ratio of 2 parts of additional water to 1 part composition imparts a smooth, very crisp, water-repellent and stain-resistant finish to the fabrics, a dilution of up to 50 to 1 is recommended in accordance with the individual starching requirements.

It will be readily understood by one skilled in the art that bluing, optical bleaches, perfumes and other such additives may be incorporated in this novel starch composition.

In preparing the starch composition, water was heated, as shown in Example 1 to a temperature of 140° F. This temperature will vary but must not be less than the melting point of the specific wax employed. So also, the temperature at which the starch is cooked may vary from 170° F. to the boiling point of water, depending upon the type of the starch used and the length of time it is cooked.

The novel use of raw starch as hereindescribed, makes it possible to impart a finish to fabric which is crisp, yet not "cracking stiff." The raw starch, here advocated, is spread on the fibers of the fabric before the granules are swollen and broken down, thereby giving a better starch coverage per unit area when ironing.

Among the distinct advantages noted as resulting from the use of the improved fabric composition, fabrics treated with it do not tend to wrinkle as easily as similar materials treated with starch alone; in the event that water is splashed upon the ironed fabrics, there is a distinct tendency to shed such water instead of absorbing it; while in addition fabrics treated with the improved product are definitely less harsh, sharp and scratchy to the skin, than material treated with any starch product on the market today. The treated fabrics in short, have velvety or soft stiffness.

If a long shelf life is desired, a protective colloid aids the stability of the suspended starch and yet, in combination with the incorporated wax and metal salt render the composition, not only capable of rendering a starchy finish, but also of imparting a desirable stain-resistant, water-repellent finish in one operation. It should be realized that an additional aid to good dispersion may be added in the form of an added emulsifying agent or agents. Examples of these are condensates of long chain fatty acids, etc.

Thus, in accordance with my invention, a novel aqueous fabric treating composition has been produced which is capable of utilizing raw starch and by a simple operation imparting a finish to laundry fabrics heretofore desired but never achieved.

Other modes of applying the principle of the invention may be employed instead of those explained, change being made as regards the method and/or the composition herein disclosed, provided the step or steps stated or the composition described in any of the following claims or the equivalent of such stated step or steps or composition be employed.

I claim:

1. An aqueous fabric-treating composition comprised essentially of wax, water-soluble polyvalent metal salt, cooked starch, raw starch and water, said starches, comprising from 50 to 98% of the total solids content of said composition, the raw starch being present in a ratio of at least three parts to each part of cooked starch.

2. An aqueous fabric-treating composition comprised essentially of paraffin, water-soluble polyvalent metal salt, cooked starch, raw starch and water, said starches comprising from 50 to 98% of the total solids content of said composition, the raw starch being present in a ratio of at least three parts to each part of cooked starch.

3. An aqueous fabric-treating composition comprised essentially of paraffin, water-soluble aluminum formate, cooked starch, raw starch and water, said starches comprising from 50 to 98% of the total solids content of said composition, the raw starch being present in a ratio of at least three parts to each part of cooked starch.

4. An aqueous fabric-treating composition comprised essentially of paraffin, water-soluble aluminum acetate, cooked starch, raw starch and water, said starches comprising from 50 to 98% of the total solids content of said composition, the raw starch being present in a ratio of at least three parts to each part of cooked starch.

5. An aqueous fabric-treating composition comprised essentially of paraffin, water-soluble zirconium oxychloride, cooked starch, raw starch and water, said starches comprising from 50 to 98% of the total solids content of said composition, the raw starch being present in a ratio of at least three parts to each part of cooked starch.

6. An aqueous fabric-treating composition comprised essentially of paraffin, water-soluble aluminum formate, protective colloid, cooked starch, raw corn starch and water, said starches comprising from 50 to 98% of the total solids content of said composition, the raw corn starch being present in a ratio of at least three parts to each part of cooked starch.

7. An aqueous fabric-treating composition comprised essentially of paraffin, water-soluble aluminum acetate, protective colloid, cooked starch, raw corn starch and water, said starches comprising from 50 to 98% of the total solids content of said composition, the raw corn starch being present in a ratio of at least three parts to each part of cooked starch.

8. An aqueous fabric-treating composition comprised essentially of paraffin, water-soluble zirconium oxychloride, protective colloid, cooked starch, raw corn starch and water, said starches comprising from 50 to 98% of the total solids content of said composition, the raw corn starch being present in a ratio of at least three parts to each part of cooked starch.

9. An aqueous fabric-treating composition comprised essentially of paraffin, water-soluble aluminum formate, polyvinyl alcohol, cooked starch, raw corn starch and water, said starches comprising from 50 to 98% of the total solids content of said composition, the raw corn starch being present in a ratio of at least three parts to each part of cooked starch.

10. An aqueous fabric-treating composition, comprised essentially of paraffin, water-soluble aluminum acetate, polyvinyl alcohol, cooked starch, raw corn starch and water, said starches comprising from 50 to 98% of the total solids content of said composition, the raw corn starch being present in a ratio of at least three parts to each part of cooked starch.

11. An aqueous fabric-treating composition comprised essentially of paraffin, water-soluble zirconium oxychloride, polyvinyl alcohol, cooked starch, raw corn starch and water, said starches comprising from 50 to 98% of the total solids content of said composition, the raw corn starch being present in a ratio of at least three parts to each part of cooked starch.

12. An aqueous fabric-treating composition comprised essentially of paraffin, water-soluble aluminum formate, polyvinyl alcohol, cooked waxy maize starch, raw corn starch and water, said starches comprising from 50 to 98% of the total solids content of said composition, the raw corn starch being present in a ratio of at least three parts to each part of cooked waxy maize starch.

13. An aqueous fabric-treating composition comprised essentially of paraffin, water-soluble aluminum acetate, polyvinyl alcohol, cooked waxy maize starch, raw corn starch and water, said starches comprising from 50 to 98% of the total solids content of said composition, the raw corn starch being present in a ratio of at least three parts to each part of cooked waxy maize starch.

14. An aqueous fabric-treating composition comprised essentially of paraffin, water-soluble zirconium oxychloride, polyvinyl alcohol, cooked waxy maize starch, raw corn starch and water, said starches comprising from 50 to 98% of the total solids content of said composition, the raw corn starch being present in a ratio of at least three parts to each part of cooked waxy maize starch.

15. An aqueous fabric-treating composition comprised essentially of paraffin, water-soluble aluminum formate, polyvinyl alcohol, cooked waxy maize starch, raw corn starch and water, said starches comprising from 50 to 98% of the total solids content of said composition, the raw corn starch being in a ratio of 3 to 9 parts to each part of cooked waxy maize starch.

16. An aqueous fabric-treating composition comprised essentially of paraffin, water-soluble aluminum acetate, polyvinyl alcohol, cooked waxy maize starch, raw corn starch and water, said starches comprising from 50 to 98% of the total solids content of said composition, the raw corn starch being in a ratio of 3 to 9 parts to each part of cooked waxy maize starch.

17. An aqueous fabric-treating composition comprised essentially of paraffin, water-soluble zirconium oxychloride, polyvinyl alcohol, cooked waxy maize starch, raw corn starch and water, said starches comprising from 50 to 98% of the total solids content of said composition, the raw corn starch being in a ratio of 3 to 9 parts to each part of cooked waxy maize starch.

18. A method of making a fabric-treating composition comprising dispersing a protective colloid in water heated to a temperature of at least 125°

F., adding water-soluble polyvalent metal salt and wax to said water-colloid mixture, and homogenizing said mixture, cooking starch at a temperature of at least 170° F., combining said cooked starch with said wax mixture and admixing raw starch with the suspension with sufficient agitation to uniformly disperse said raw starch in the aqueous medium, said starches comprising from 50 to 98 per cent of the total solids content of said composition, the raw starch being present in a ratio of at least three parts to each part of cooked starch.

19. A method of making a fabric-treating composition comprising dispersing a protective colloid in water heated to a temperature of at least 125° F., adding water-soluble polyvalent metal salt and wax to said water-colloid mixture, and homogenizing said mixture, cooking starch at a temperature of at least 170° F., cooling said starch, combining it with said wax mixture, adding additional protective colloid and admixing raw starch with the suspension with sufficient agitation to uniformly disperse said raw starch in the aqueous medium, said starches comprising from 50 to 98 per cent of the total solids content of said composition, the raw starch being present in a ratio of at least three parts to each part of cooked starch.

CLIFFORD T. ROOD.

REFERENCES CITED

The following references are of record in the file of this patent:

UNITED STATES PATENTS

| Number | Name | Date |
| --- | --- | --- |
| 181,150 | Dietrich | Aug. 15, 1876 |
| 358,082 | Sperry | Feb. 22, 1887 |
| 793,600 | Holtkamp | June 27, 1905 |
| 1,463,403 | Pickard | July 31, 1923 |
| 2,127,896 | Vohrer | Aug. 23, 1938 |
| 2,138,751 | Vohrer | Nov. 29, 1938 |
| 2,192,488 | Reilly | Mar. 5, 1940 |
| 2,250,681 | Schwartz | July 29, 1941 |
| 2,258,741 | Champion et al. | Oct. 14, 1941 |
| 2,277,788 | Shipp | Mar. 31, 1942 |
| 2,402,351 | Smith | June 18, 1946 |
| 2,462,108 | La Piana | Feb. 22, 1949 |

OTHER REFERENCES

Schopmeyer et al., "Ind. and Eng. Chem.," vol. 35, 1169 to 1172 (1943).

Du Pont Elvanol, page 20 (1947).

Bennett: The Chemical Formulary, vol. IV (1939), pages 524, 527, 528.